May 24, 1927.　　　　　　W. C. POOLE　　　　　　1,629,734

WINDSHIELD WIPER

Filed July 30, 1924

Inventor,
W. C. Poole,
By
Attorney

Patented May 24, 1927.

1,629,734

UNITED STATES PATENT OFFICE.

WILLIAM CALVIN POOLE, OF COALGROVE, OHIO.

WINDSHIELD WIPER.

Application filed July 30, 1924. Serial No. 729,110.

This invention relates to a wiper or cleaner for automobile windshields, other transparencies, or analogous devices.

One important aim is to produce a construction, preferably treadle-operable, which dispenses with a spring and its attendant objections.

A second object is to provide a novel form wherein minimum movement of the treadle or equivalent imparts greater movement to the wiper or cleaner, utilizing a crank movement which particularly is compact so that an exceedingly small article results and may be used without unduly obscuring the transparency.

With the above and servient objects in view, some of which will be hereinafter referred to and others of which will become obvious, the invention has been embodied in one operative form as illustrated in accompanying drawings.

In said drawings:—

Referring specifically to the drawings, wherein like reference characters designate like or similar parts, a glass or transparency of an automobile windshield, usually the upper section, is shown at A, bordered by a frame B. These parts are conventional.

Figure 1:
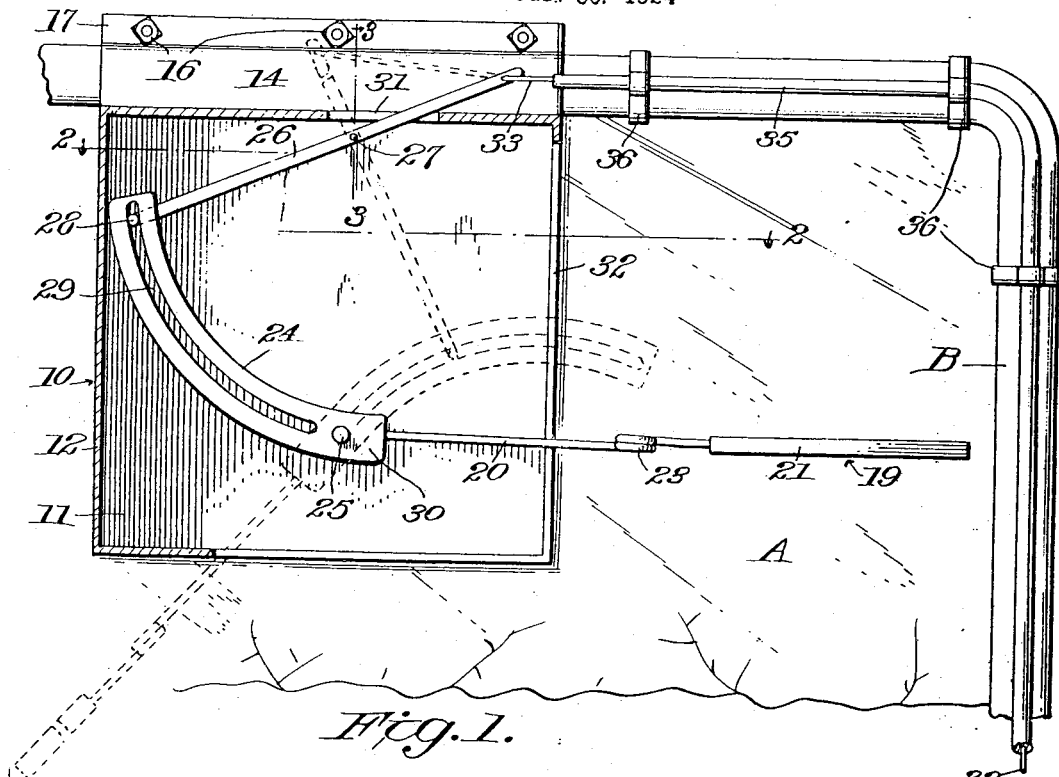
Figure 1 is a fragmentary view looking toward a windshield from a position in front of the automobile equipped therewith, cover of the casing of my improvements being shown in section to disclose details.

In carrying out the invention, a suitable casing or housing is provided as at 10 which may consist of a base or plate 11, of any desired shape or material, usually wood or metal. Telescoped over the base is a cover 12, usually of sheet metal pressed into form, and removably attached to said base 11 as by screws or equivalent fastenings 13. This casing 10 in any approved manner, is secured in place on the frame B as by providing a clamp jaw 14 integral with the cover 12 and disposed at the upper end thereof. Coacting with the jaw or clamp section 14 is a jaw or clamp section 15. Jaws 14 and 15 embrace opposite sides of the frame B, preferably at the upper runner or stile thereof and are held together and with the desired clamping pressure by one or more bolts 16 or the equivalent passing through flanges 17 at the upper edges of said jaws 14 and 15. If desired, felt or the like as at 18 may be applied between the jaws 14 and 15 and frame B in order to prevent mutilation of the frame.

Figure 2:
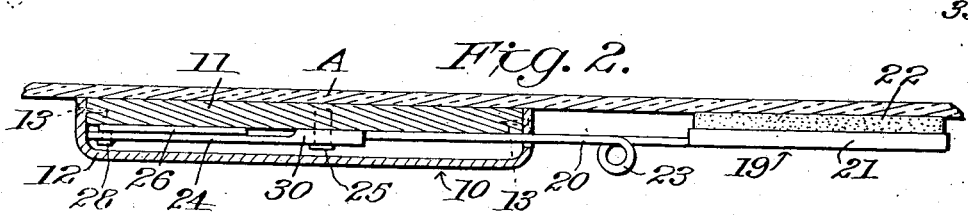
Figure 2 is a sectional view taken on the line 2—2 of Figure 1.
Figure 3:
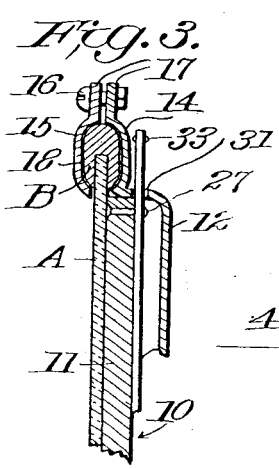
Figure 3 is a sectional view taken on the line 3—3 of Figure 1.

A wiper or cleaner for the transparency A is shown at 19 and may be of any desired form. This wiper consists of an arm 20 carrying a holder 21 equipped with a rubber, felt or other cleaning strip or squeegee 22 disposed in contiguous relation with the transparency as best shown in Figure 2 and yieldingly held in and urged to that position by the handle 20 since the same is of resilient metal and has one or more spring coils 23 intermediate its ends.

Arm 20 extends from one end of a suitable crank 24 which is located within the housing 10 and preferably pivoted by a pin or the like 25 to the base of said housing.

At 26 a shifting lever for the crank 24 is provided. Lever 26 is pivoted by the pin or the like 27 on the base 11 and is disposed partly within and partly without the casing. The end of lever 26 within the casing has a lug 28 extending at a right angle therefrom, disposed and movable in a curved, elongated crank slot 29. It is to be noted, particularly from Figure 2, that lever 26 travels in the rear of crank 24 for the length of the slot and to permit this movement, the crank is relatively thick at one end 30 thereof so as to offset the remainder of the crank from the base. It is through the thickened or widened portion 30 that the pivot pin 25 extends. Cover 12 is provided with suitable slots at 31 and 32 through which the lever 26 and arm 20, respectively, extend and move.

Figure 4:
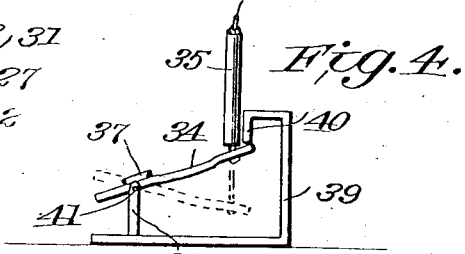
Figure 4 is a detail side view of the treadle portion of the device.

The lever 26 is preferably operated by a treadle mechanism as shown in Figures 1 and 4. To this end, a resilient metallic wire 33 is fastened to the upper end of lever 26 exteriorly of the casing 10 and at its other end is fastened to a treadle 34 (Figure 4). Cable 33 passes through and is guided by a tube or sheathing 35 of appropriate shape and preferably conforming to that of the adjacent portion of frame B. Sheathing 35 is held in place in any suitable manner as by conventional clips 36 disposed over the tube and engaging the frame B. The tube 35 is thus stationary while the wire 33 slides therein and relatively thereto.

Treadle 34 is pivoted intermediate its ends by a horizontal pin 37 to an upright 38 carried by a bracket 39 which is fastened in any suitable manner to the floor board of the automobile equipped with transparency A, and preferably within reach of a foot of the driver of such automobile. Bracket 39 preferably has a depending lug at 40 which is engageable by the forward end of treadle 34 in order to limit upward movement of the latter. This treadle, at its upper surface, may be generally shaped to accord with the bottom of a shoe and to this end particularly has a raised portion as at 41 for accommodation in front of the heel and for abutment by the breast thereof.

In operation, movement of the foot of the operator on treadle 34 rocks the latter so as to move the wire 33 in opposite directions and thereby impart oscillatory movement to lever 26, which in turn correspondingly moves the crank 24, arm 20 and the wiper. The normal position of the parts is shown in full lines in Figure 1, while the extremity of actuation thereof is suggested by the dotted lines, the wiper thus moving in an arc of which pivot 25 is the center. It is to be noted that the distance from pivot 27 to pivot 25 is greater than that from pivot 27 to lug 28 and hence the wiper will be moved to a greater extent than the lever 26. This feature conduces greatly to compactness so that the housing may be of minimum size and when installed will not unduly obstruct the vision through the transparency A. As the wire 33 is tensioned to normally occupy the full line position of Figure 1, its resiliency will assist the action of the operator's foot in restoring the wiper to the normal or full line position after a depression of the treadle to swing the wiper.

Attention is further called to the compact feature of the lever 26 being disposed partly in front of the casing clamp means as at 14 and 15, and opposite such clamp means having the connection with the operating wire 33.

Various changes may be resorted to provided they fall within the spirit and scope of the invention.

What is claimed is:

1. A device of the class described including an operating lever, a pivoted crank having an elongated crank slot, means extending laterally from the lever and disposed in said slot to form a connection, said means being closer to the pivotal axis of the lever than the pivotal axis of the lever is to the crank, said means normally being at the end of the slot remote to the pivotal axis of the crank, and a wiper carried by said crank.

2. A device of the class described having an operating lever, a pivoted crank, said crank having an offset portion beneath which said lever moves, said portion having an elongated slot, means extending from the lever and into said slot, said means being located closer to the axis of the lever than the distance from said axis to the axis of the crank, and a wiper operatively connected with the said crank.

3. A device of the class described comprising a base, an operating lever pivoted thereto, a crank pivoted to said base and provided with a crank slot, said crank having a portion offset from said base and under which said lever moves, means on said lever disposed in said slot, said means being located closer to the pivotal axis of the lever than to the pivotal axis of the crank, and a wiper operatively connected with said crank.

4. A device of the class described comprising a base, an operating lever pivoted thereto, a crank pivoted to said base and provided with a crank slot, said crank having a portion offset from said base and under which said lever moves, means on said lever disposed in said slot and located closer to the axis of the lever than to the pivotal axis of the crank, a wiper operatively connected with said crank, a cover attached to said base and provided with slots through which said lever and wiper extend, a clamping jaw integral with the cover and rising from its upper edge and at the rear of the device, a jaw coacting with said clamping jaw to attach the device to a support, securing and clamping means for said jaws, and an actuating means for the lever connected thereto and partially movable substantially in front of the first mentioned jaw.

In testimony whereof I have affixed my signature.

WILLIAM CALVIN POOLE.